United States Patent [19]

Barrella

[11] Patent Number: 5,000,396
[45] Date of Patent: Mar. 19, 1991

[54] FILM SPOOL WITH INTEGRAL BATTERY COMPONENT

[76] Inventor: Joseph N. Barrella, 175 Mountain Rd., Irvington, N.Y. 10533

[21] Appl. No.: 215,025

[22] Filed: Jul. 5, 1988

[51] Int. Cl.⁵ .......................... G03B 1/04; G03B 1/18
[52] U.S. Cl. .................................... 242/71; 354/173.1
[58] Field of Search ............................. 242/71, 71.1; 354/173.1, 203, 212, 214, 288; 429/168, 218, 224, 229

[56] References Cited

U.S. PATENT DOCUMENTS

| | | | |
|---|---|---|---|
| 2,989,906 | 6/1961 | Rentschler | 354/173.1 |
| 3,530,496 | 9/1970 | Amano et al. | 429/224 |
| 3,859,137 | 1/1975 | Jammet | 429/168 |
| 3,902,921 | 9/1975 | Augustynski et al. | 429/224 X |
| 3,953,240 | 4/1976 | Fullenbach et al. | 429/168 X |
| 3,997,362 | 12/1976 | Eustace et al. | 429/218 X |
| 4,344,685 | 8/1982 | Milatz et al. | 354/173.1 |

FOREIGN PATENT DOCUMENTS 2833619 2/1980 Fed. Rep. of Germany .
63-10154 1/1988 Japan .

*Primary Examiner*—Stuart S. Levy
*Assistant Examiner*—Steven M. duBois
*Attorney, Agent, or Firm*—Israel Nissenbaum

[57] ABSTRACT

A photographic film spool, having a central core member (for engagement with a camera film-spool anchoring and rewinding element), contains an integral battery component for electrically powering selected camera functions. The battery, comprised of one or more electrically interconnected cells, is configured for electrical engagement with terminals in the camera particularly through the camera film-spool rewind and anchoring element, with the battery thereby functioning as both the power supply and as part of the film drive. In addition, the battery has sufficient capacity to power the camera functions whereby the film may be totally utilized. The battery further has a shelf life, with such sufficient capacity, for a period of time at least as long as the utilizable shelf life of the film.

10 Claims, 2 Drawing Sheets

FILM SPOOL WITH INTEGRAL BATTERY COMPONENT

The present invention relates to batteries for powering cameras and particularly to batteries for cameras which utilize roll type films.

With the advent of increasingly sophisticated cameras and the additional requirements for electrical power, the importance of the battery, used to power the camera functions, has concomitantly become increased. It is however difficult to ascertain in the freshness and residual capacity in a battery within the camera. The common "red light" indicator provided in many cameras frequently merely informs the user of the substantial depletion of the battery capacity. Intermediate capacities may however be insufficient to correctly provide proper exposure by electronically interfacing shutter speed and lens openings. More importantly the battery may suddenly become unexpectedly inoperative, particularly after long periods of inactivity, when no replacement batteries are to be found.

In order to obviate this problem, photographic supply companies such as Polaroid Corp. have integrated their film packs with throw-away batteries to ensure that a fresh battery is always powering the camera functions. The Polaroid film is configured in the form of flat removable film layers and the battery, of a similar flat thin layer configuration or prismatic type, is positioned beneath the last film layer. The battery is fixed into a stationary position, during use, with exposed terminal contacting surfaces of the battery being engaged with terminal connections of the camera. The battery remains in such position until the film pack is completed and the film pack carrier is removed from the camera. A similar battery powering arrangement for a cylindrical roll type film, such as the common 35 mm film, has not been developed particularly since the film does not remain stationary but rather is rotated during the operation thereof. Accordingly, batteries used in cameras with roll type film are presently situated in compartments of the camera separated from the film and have capacities sufficient for use with at least several rolls of film including flash cycles. As a result, cameras, particularly those with built-in flash units, are rendered bulkier and heavier by the additional battery compartments and weight of the full size batteries.

It is an object of the present invention to provide a roll type film with an economical integral battery structure to provide fresh battery power for cameras using the roll type film, whereby bulky battery compartments in cameras can be eliminated and the weight of the battery required is substantially reduced.

It is a further object of the present invention of fixedly include such integral battery with a standard film roll by keying or stationary fixing means whereby the battery operates, in conjunction with the film-drive mechanism of the camera, to anchor the film spool or to drive the film spool during rewinding.

These and other objects, features and advantages of the present invention will become more evident from the following discussion and the drawings in which.

Figure 4:
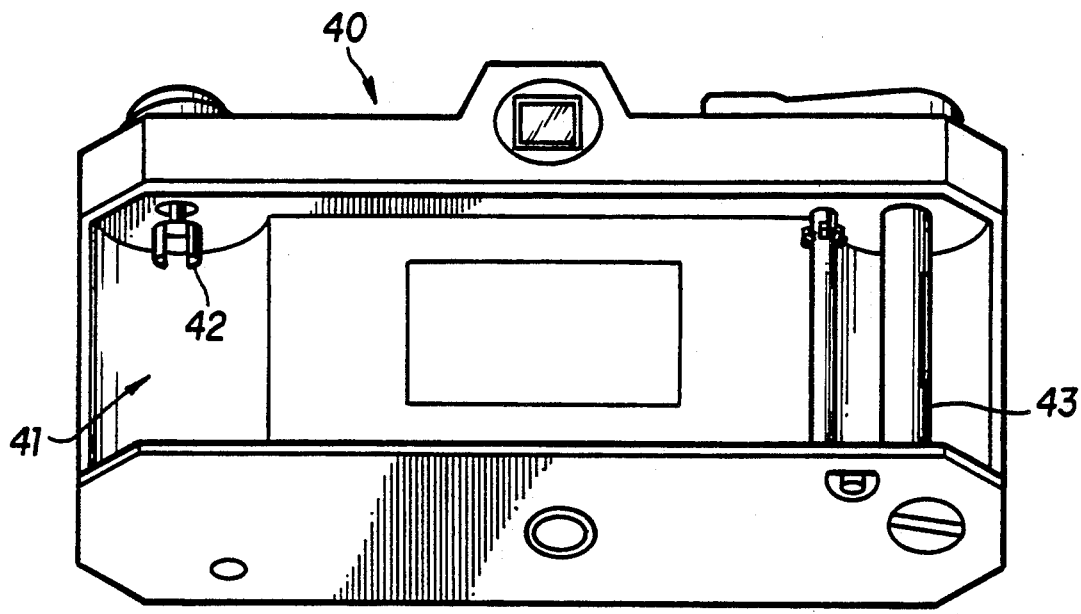
Figure 4A:
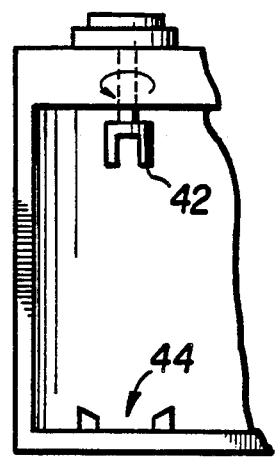
Figure 4B:
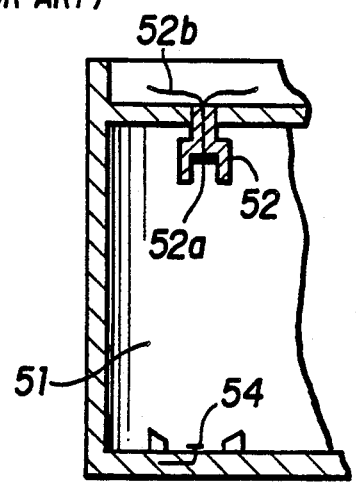

FIG. 4 is a plan view of a typical 35 mm camera showing the film compartment and film-spool anchoring and rewinding drive element of a typical camera; and FIGS. 4A and 4B are schematic comparisons of the film-spool anchoring and rewinding drive element of a standard camera and a camera having the modified element for electrical contact with the integral battery of the film spool, of the present invention.

Generally the present invention comprises a film roll integrated with an electrochemical cell or battery for powering functions of a camera into which the film is loaded. Common film rolls such as the 35 mm films have spools, generally of plastic, upon which the film is wound and in which the central core is hollow. In accordance with the present invention, such hollow core is filled with electrochemical cell elements of anode, cathode and electrolyte with conductive terminal elements preferably at the ends of the core. At least one of the terminal elements of the battery is adapted for continuous electrical engagement with an electrical contact of the camera contained within the film-spool anchoring (i.e. anchoring the film spool in a position whereby it can rotate for unwinding of the film roll) and rewinding drive element of the camera. The rewind drive element is generally fork shaped and the terminal element is preferably adapted to fit within this fork and into engagement with a spring loaded electrical contact contained within the base of the fork. If the terminal element is sufficiently fixed into position in the battery or the core of the film spool, it may also function as the drive engaging member of the film roll for rewinding of the film or the fixing member for holding the film spool in place while the film is being unwound. In addition, or alternatively the film spool comprises drive engaging means peripheral to the terminal element for driving engagement with the rewinding element. If the terminal element is utilized as part of the unwinding and rewinding mechanism it is preferably squared off for non-slip engagement with the forked drive member.

In a preferred embodiment of the present invention, wherein maximum capacity is required for the cell or battery, the core walls themselves serve as the container for the electrochemcial cell or battery, with the end terminals further serving to seal the electrochemical cell elements from contacting the film. In such embodiment it is preferred that only the separate drive engagement means, integral with the film spool, engage the forked drive member. Alternatively, the cell or battery is of a self contained unit with an outer cell or battery container which is fixed into position by means such as a mating key portion between the container and the inner wall of the core or by making the container and the central core slightly ovate to prevent independent relative movement of the battery and the spool. In such embodiments, wherein the cell container is locked into position within the film spool and the terminal (which engages the film drive) is integral with the container, the terminal itself preferably provides both the electrical contact and the point of engagement for rewinding or anchoring of the film spool during unwinding of the film. Since the film spool is generally comprised of two halves which are sealed together, the electrochemical cell elements can be readily inserted therein prior to such sealing. Alternatively, the spool may be readily modified with a core having one open end and one closed end with the cell or battery being inserted into the open end and then fixed into position. As a result, current film production methods can be utilized for the inclusion of battery elements within standard film spools with only minor modifications, if any, to the film spool. Accordingly, the film rolls of the present invention will remain utilizable even with cameras not having been configured for utilization of the contained battery. It is of course understood that cameras effectively utilizing such film and battery require terminal contact modification.

An ideal battery for use in accordance with the present invention is the common zinc/manganese dioxide alkaline cell because of its relatively high capacity, long shelf life and of course its economic advantage over newer lithium based batteries though the latter cells may be similarly utilized in the film rolls of the present invention. The zinc/manganese dioxide alkaline cell also provides the high currents required for flash and film transport operations. In offsetting the economic disadvantages, lithium based batteries do have the advantages of providing about 3 volts in the common $Li/MnO_2$ cells or similar cells whereby the many electronic functions of current cameras may be adequately powered by a single cell. In contrast, two zinc/manganese dioxide cells, linked in series, are required to provide the same voltage. In addition the lithium cells provide longer shelf life capability and operate over a wider temperature range.

In cameras having accessories such as flash or film winders with their own individual power sources and since most of the other camera functions are generally microprocessor controlled with low power requirements, continued high drain rates are not required from the battery.

The battery capacity is limited by the available volume or the cell or battery. The standard 35 mm film roll has a central core with an overall length of about 1.75" (4.45 cm) and an i.d. of about 0.375" (0.95 cm) with a total core volume of about 0.19 in$^3$. This volume is further reduced by an interior recessed end wall in currently standard film spools which reduces the effective length to about 1.125" and a volume of about 0.12 in$^3$. The capacity required for a single frame in a 35 mm film roll with flash is about 0.005 Ahr, utilizing two alkaline cells in series. This includes the additional capacity required for activation of the shutter, rewinding (on a proportional basis) and film advance. Thus, for films rolls having the standard 36 frame capacity the total battery capacity (at 3 volts) should be at least about 0.2 Ahr and the battery should be capable of sustaining a high current drain of about a 2 ampere peak for flash photography. A standard AAA size zinc/manganese dioxide battery is nominally rated at about 866 mAhr capacity with an interior volume of about 3.6 cc or about 0.220 Ahr in the volume of 0.12 in$^3$ available in the central core of a film spool. If the entire available volume of the central core of the film spool is utilized, the capacity becomes a more than ample 0.348 Ahr. The average effective lifetime of a color film roll is about two years without color deterioration and during such period the effective loss of cell capacity in an alkaline zinc/manganese dioxide battery is about 10%. Accordingly there is retained more that sufficient power in the integral battery to power camera functions in relation to the film lifetime.

With the electrochemical cell components within the cell, metal button tabs are placed in electrical contact with the respective anode and cathode materials with plastic being molded therearound in order to fully seal the electrochemical cell therewithin. If higher voltages are required, individual button type cells may be placed in abutting series configuration. Alternatively, if higher drain rate is required such as for flash applications, the cells may be arranged in parallel configuration. In such specialized battery requirements the film packs are marked accordingly for consumer recognition.

Figure 1:
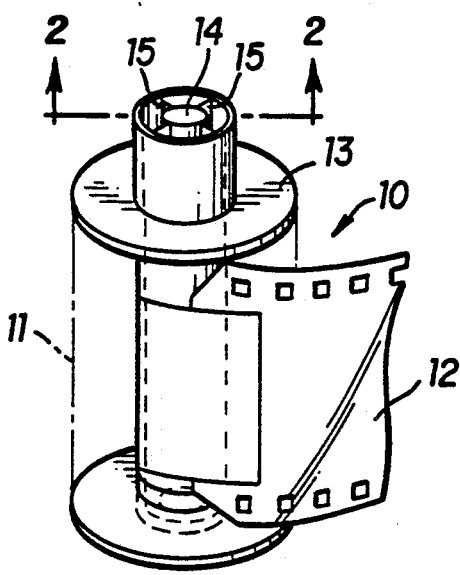
FIG. 1 is an isometric view, partially in phantom, of a roll type film having a battery integrated therewith in accordance with the present invention.
Figure 3:
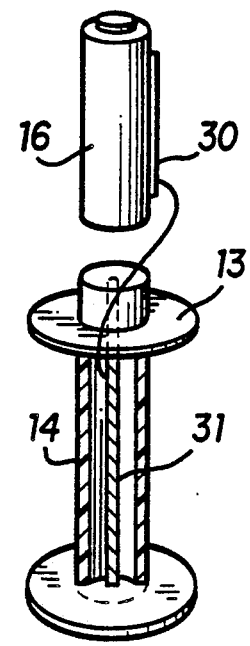
FIG. 3 is a side view of the battery of FIG. 2A showing the fixed keying section for positioning within a film spool having a mating section.
Figure 2A:
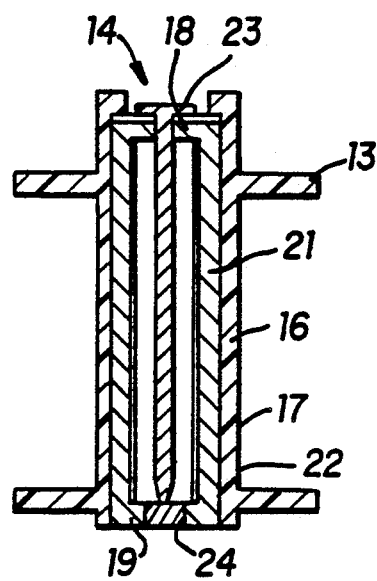
FIG. 2A is a sectioned view of the film roll of FIG. 1 taken along line 2—2 wherein the contained battery is a single cell lithium battery.

With specific reference to the drawings, FIG. 1 depicts a typical roll type film 10, comprising an outer protective can 11, and an elongated film strip 12 coiled on a plastic spool 13. Plastic spool 13 has a hollow central core 14 with tab elements 15 situtated at one end of the core for engagement with a winding element of the camera in which the film is placed. As is more clearly evident from FIGS. 2A and 2B, the central core 14 contains the cell or cells of the present invention. In FIG. 2A, single cell 16 comprises a lithium anode 21, a cup shaped separator element 17, and a solid cathode 22 such as of manganese dioxide or $CF_x$ with a suitable electrolyte compatible with the plastic of the film spool 13. The insulative plastic walls of central core 14 provide the container for the cell and plastic buttons 18 and 19 serve to seal the cell 16 at both ends after the cell has been seated on tab elements 15. Positive and negative terminal elements 23 and 24 extend from the cathode 21 and anode 22 respectively and through plastic buttons 18 and 19 for engagement with corresponding terminals of the camera.

Figure 2B:
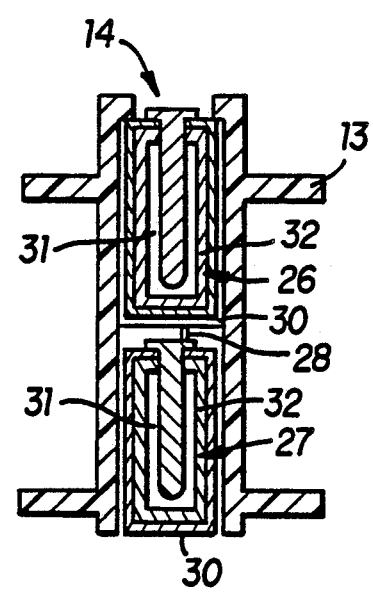
FIG. 2B is the same view as in FIG. 2A but with two alkaline zinc/manganese dioxide batteries connected in series.

In FIG. 2B two button type cells 26 and 27 are abutted into a single battery unit with each cell containing a zinc anode 32 and a manganese dioxide cathode 31 and a central electrically conductive metallic tab 28 between the individual cell units. The series-connected cells provide about the same 3.0 voltage as that of the single lithium cell shown in FIG. 2A. In this embodiment the cells 26 and 27 are shown within individual cell containers 30. In addition, if a battery rigidly fixed within the film spool is desired, the cells may be placed into an additional outer container which is keyed with the film spool, though at the cost of an additional element and the loss of some capacity volume. Alternatively, if an increased capacity is desired, the cells 26 and 27 may be inserted into core 14 without the individual containers 30 but with the walls of the core functioning as the container for the cells. A metallic interconnecting disc may be inserted into core 14 between the individual cells in place of tab 28 for the requisite intercell connection. If desired for higher rate applications, the interior walls of the central core 14 may be metallized to function as a thin conductive container element. Electrolyte leakage from the cells is substantially minimized by the fact that the cool storage conditions necessary for maintaining the integrity of the film similarly maintain the integrity of the cell or cells.

A typical 35 mm camera, shown in FIG. 4, has a well 41 for accommodation of the film spool 13. The film rewind element 42, in a fork shape, fits partially within the film spool core 14 into juxtaposed position with tabs 15 (shown in FIG. 1) for engagement during rewinding of the film and as an anchoring brace during winding. The rewind element 42 is otherwise freely rotatable in the unwinding or clockwise direction.

The film 12 is wound on to take-up spool 43 and unwound from it during use. In a typical camera, as seen in FIG. 4A, the rewind drive 42 is of a solid metallic element in a fork configuration. This drive engages the film spool via tab elements 15, with the base of the film spool being held within a depression 44 whereby rotation of the film spool during winding and unwinding is not hindered. In accordance with the present invention, as seen in FIG. 4B, the fork shaped drive 52 includes a spring loaded wiping type terminal contact element 52a, about which the fork drive is freely rotatable, for engagement with the cell terminal element such as terminal 18 in FIG. 2A. Electrical contact wire 52b passes through the hollowed center of fork drive element 52 into electrical contact with the elements of the camera requiring electrical power for functioning. Alternatively, the terminal contact element may be fixed into position relative to both the fork shaped drive and the cell terminal element. Engagement of the terminal contact element with the wire or the wire itself, in such embodiment, includes an element, such as a circular contact track which will allow for rotation without twisting of the wire. A second wiping spring loaded terminal 54 is provided at the base of film well 51 for engagement with the other cell terminal element such as terminal 19 in FIG. 2A.

Film 10 with contained cell 16 (or cells 26 and 27) is seated within camera 40. Spring loaded contact elements 52a and 54 are brought into engagement with terminal elements 23 and 24 with contact being maintained during the winding and rewinding of the film.

It is understood that the above example and description is illustrative of the present invention and any specifics contained therein are not to be contrued as limitations on the invention. Changes may be made in the composition and structure of the cell and a film and the configuration of the terminal contact elements in both the cell and the camera without departing from the scope of the present invention as defined by the following claims.

What is claimed is:

1. A photographic film roll for use in a camera having electrically powered components and electrical contact elements for electrical connection between one or more electrochemical cells and said electrically powered components, said film roll being comprised of a strip of film wound upon a plastic spool comprising a cylinder having a hollow central core and a circular flange integrally formed on the outer peripheral surface of the cylinder at each of the proximate ends of the cylinder, with the wound strip of film being axially retained therebetween, said strip of film and said spool being contained within an outer protective container, and said film roll being loaded into said camera for utilization and unloaded for developing, characterized in that said central core integrally contains one or more electrochemical cells, sealingly enclosed within a metallic cell container, said one or more electrochemical cells and containers being fixedly positioned and completely enclosed within said central core, with said cells being adapted to power the electrically powered components of the camera utilizing said film, and said film roll further comprising means for maintaining constant electrical contact between terminals of said one or more cells and the electrical contact elements of said camera during utilization of said film.

2. The film roll of claim 1 wherein said central core contains a single electrochemical cell having an anode comprised of lithium.

3. The film roll of claim 1 wherein said central core contains two electrochemical cells in series with each cell having an anode comprised of zinc, a cathode comprised of manganese dioxide and an alkaline electrolyte.

4. The film roll of claim 1 wherein said cell comprises means for fixed engagement with said film spool.

5. The film roll of claim 1 wherein said central core further comprises integral extension portions for engagement with a rewind drive member of said camera at a position peripherally adjacent to a terminal of said one or more cells.

6. The film roll of claim 1 wherein the capacity of said one or more cells is at least about 0.2 mAhrs.

7. The film roll of claim 1 wherein at least one terminal of said one or more cells is adapted for electrical engagement with a spring loaded electrical contact element of said camera which is integrated with a rewind drive member of said camera.

8. A photgraphic film roll for use in a camera having electrically powered components and electrical contact elements for electrical connection between one or more electrochemical cells and said electrically powered components, said film roll being comprised of a strip of film wound upon a plastic spool comprising a cylinder having a hollow central core a circular flange integrally formed on the outer peripheral surface of the cylinder at each of the proximate ends of the cylinder, with the wound strip of film being axially retained therebetween, said strip of film and said spool being contained within an outer protective container, and said film roll being loaded into said camera for utilization and unloaded for developing, characterized in that said central core integrally contains one or more electrochemical cells fixedly positioned and completely enclosed within said central core, with said cells being adapted to power the electrically powered components of the camera utilizing said film, and said film roll further comprising means for maintaining constant electrical contact between terminals of said one or more cells and the electrical contact elements of said camera during utilization of said film, and wherein the inner walls of said central core are coated with a metallic layer which comprise the container for said one or more electrochemical cell.

9. A photographic film roll for use in a camera having electrically powered components and electrical contact elements for electrical connection between one or more electrochemical cells and said electrically powered components, said film roll being comprised of a strip of film wound upon a plastic spool comprising a cylinder having a hollow central core and a circular flange integrally formed on the outer peripheral surface of the cylinder at each of the proximate ends of the cylinder, with the wound strip of film being axially retained therebetween, said strip of film and said spool being contained within an outer protective container, and said film roll being loaded into said camera for utilization and unloaded for developing, characterized in that said central core integrally contains one or more electrochemical cells fixedly positioned and completely enclosed therewithin, with said cells being adapted to power the electrically powered components of the camera utilizing said film, and said film roll further comprising means for maintaining constant electrical contact between terminals of said one or more cells and the electrical contact elements of said camera during utilization of said film; wherein said one or more cells are enclosed in an outer cell container positioned within said hollow central core; wherein said cell comprises means for fixed engagement with said film spool; and wherein means for fixed engagement comprises mating keyed sections of said cell container and the inner walls of said central core.

10. The film roll of claim 9 wherein an electrical contact element of said camera is integrated with the rewind drive member of said camera, with at least one terminal of said one or more cells being adapted for both electrical contact with said electrical contact element and for engagement with said rewind drive member whereby said film roll is rotated thereby.

* * * * *